US009456327B2

(12) United States Patent
Thomaschima et al.

(10) Patent No.: US 9,456,327 B2
(45) Date of Patent: Sep. 27, 2016

(54) LOCATION-BASED EMERGENCY APPLICATION PROVIDING EFFICIENT RESPONSE

(71) Applicant: The Boeing Company, Chicago, IL (US)

(72) Inventors: Phillip Thomaschima, Buena Park, CA (US); James K. Shaw, II, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 14/325,504

(22) Filed: Jul. 8, 2014

(65) Prior Publication Data
US 2016/0014583 A1 Jan. 14, 2016

(51) Int. Cl.
*H04M 11/04* (2006.01)
*H04W 4/22* (2009.01)

(52) U.S. Cl.
CPC ..................... *H04W 4/22* (2013.01)

(58) Field of Classification Search
CPC .. H04W 4/025; H04W 8/12; H04M 2201/38
USPC ...... 455/404.2, 404.1, 456.3, 457, 445, 564, 455/558; 340/572.1, 539.22, 5.52
See application file for complete search history.

(56) References Cited

U.S. PATENT DOCUMENTS

2002/0000930 A1* 1/2002 Crowson ................. G01S 19/17
342/357.52
2010/0279710 A1* 11/2010 Dicke ..................... H04W 4/02
455/456.3
2012/0100824 A1* 4/2012 Michael .................. H04W 4/22
455/404.2
2012/0154145 A1* 6/2012 Anson .................... G08B 25/10
340/539.13

OTHER PUBLICATIONS

Wikipedia, "Common Alerting Protocol," downloaded from <http://en.wikipedia.org/wiki/Common_Alerting_Protocol> on May 14, 2014, pp. 1-4.
Wikipedia, "Commercial Mobile Alert System," downloaded from <http://en.wikipedia.org/wiki/Commercial_Mobile_Alert_System> on May 14, 2014, pp. 1-4.

* cited by examiner

*Primary Examiner* — Kiet Doan
(74) *Attorney, Agent, or Firm* — Charles L. Moore; Moore & Van Allen PLLC

(57) ABSTRACT

A system including a location-based emergency application providing efficient response may include a processor and a location-based emergency application configured to operate on the processor. The location-based emergency application may include an application program interface configured to send and receive geographic location information. The location-based emergency application may also include a data engine configured to determine a current geographic location of the system based on the geographic location information received by the application program interface. A data store may be provided that stores emergency contact information and other information associated with each of a plurality of geographic locations. The location-based emergency location application may also include a user interface module configured to provide emergency contact information and other information associated with a particular geographic location of the plurality of geographic locations.

20 Claims, 3 Drawing Sheets

LOCATION-BASED EMERGENCY APPLICATION PROVIDING EFFICIENT RESPONSE

FIELD

The present disclosure relates to communications and communications devices, and more particularly to a system including a location-based emergency application configured to provide efficient responses in emergency and other situations.

BACKGROUND

For organizations, such as companies or businesses, that have multiple geographically dispersed facilities or sites, emergency response phone numbers may not be readily accessible to employees at the various sites. This may especially be an issue for employees traveling to the various sites or facilities that may not have immediate access to emergency contact information and other information, such as preset or predetermined medical information if circumstances arise that may necessitate contacting local emergency services or on site emergency services as quickly as possible. Additionally, distributed antenna systems may be provided for wireless communications within such facilities. Distributed antenna systems do not provide geographic location information using a global positioning system (GPS) but rather utilize triangulation to a nearest cell phone tower that connects the distributed antenna system to a cellular telephone network. Accordingly, determining the geographic location of a mobile communications device by triangulation in a distributed antenna system may be highly inaccurate. Accordingly, there is a need to provide local emergency contact information and other information and to be able to efficiently contact either local or site emergency services or a public-safety access point expeditiously, particularly in a situation where emergency services need to respond as quickly as possible.

SUMMARY

In accordance with an embodiment, a system may include a processor and a location-based emergency application providing efficient response configured to operate on the processor. The location-based emergency application may include an application program interface configured to send and receive geographic location information. The location-based emergency application may also include a data engine configured to determine a current geographic location of the system based on the geographic location information received by the application program interface. A data store may be provided that stores emergency contact information and other information associated with each of a plurality of geographic locations. The location-based emergency location application may also include a user interface module configured to provide emergency contact information and other information associated with a particular geographic location of the plurality of geographic locations.

In accordance with another embodiment, a mobile communications device may include a transceiver for wireless communications and a processor configured for performing functions including controlling operation of the mobile communications device and processing signals received and transmitted by the transceiver. The mobile device may also include a location-based emergency application configured to operate on the processor. The location-based emergency application may include an application program interface configured to send and receive geographic location information. The location-based emergency application may also include a data engine configured to determine a current geographic location of the mobile communications device based on the geographic location information received by the application program interface. A data store may be provided to store emergency contact information and other information associated with each of a plurality of geographic locations. The location-based emergency application may also include a user interface module configured to provide emergency contact information and other information associated with a particular geographic location of the plurality of geographic locations.

In accordance with a further embodiment, a method for providing a location-based emergency response may include receiving, by a mobile communications device, geographic location information and determining, by the mobile communications device, a current geographic location of the mobile communication device based on the geographic location information. The method may also include providing, by the communications device, emergency contact information and other information associated with a particular geographic location of a plurality of geographic locations in response to the current geographic location of the communications device being the particular geographic location. Emergency contact information and other information associated with each of the plurality of geographic locations may be stored on the mobile communications device.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
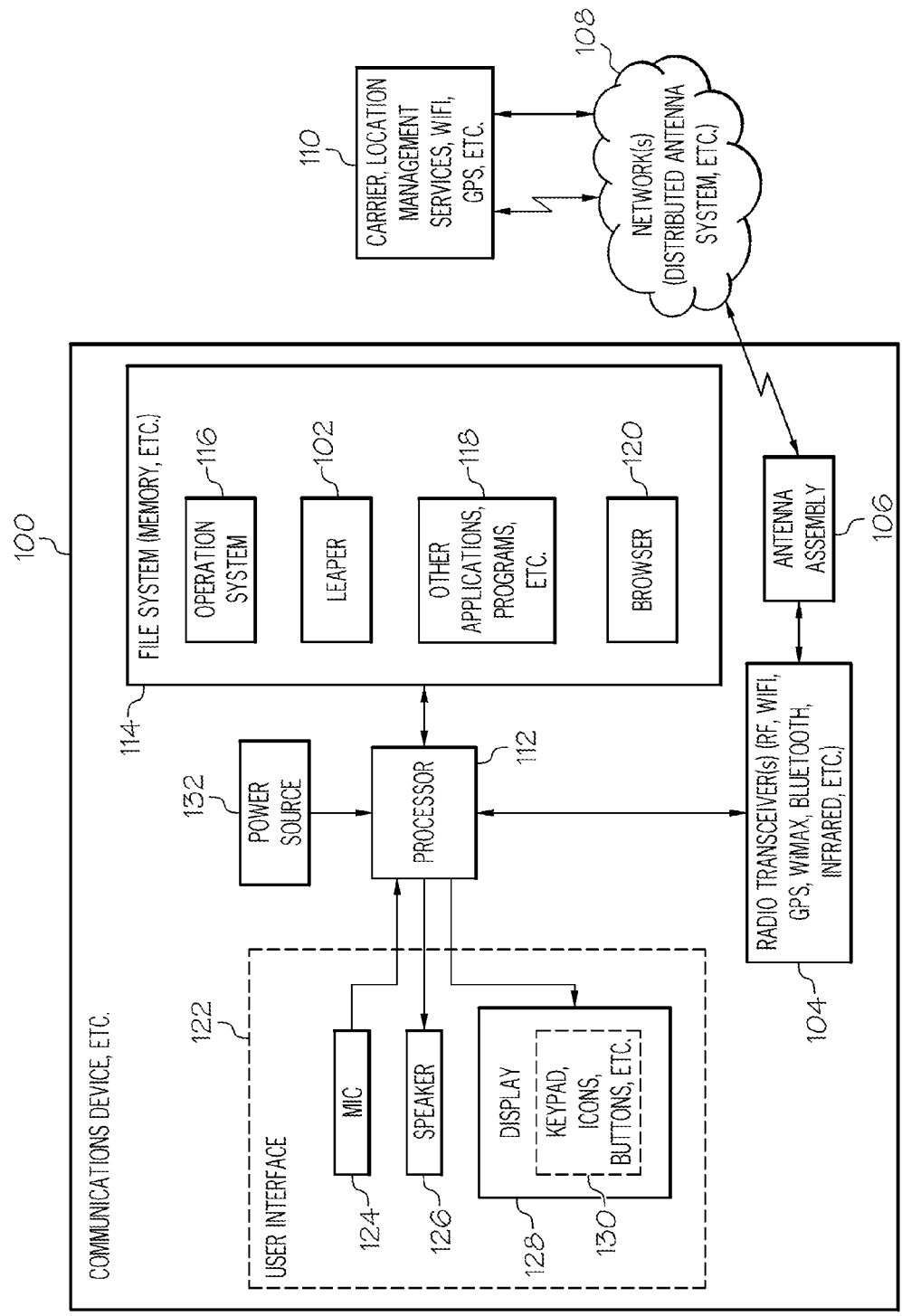
FIG. 1 is a block schematic diagram of an example of a mobile communication device including a location-based emergency application providing efficient response in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

A location-based emergency application providing efficient response (LEAPER) to emergency services or other services is described. As described herein the LEAPER application may be an application on a mobile communications device, such as a smartphone, although the features and functions described may be applicable to other devices and circumstances. The LEAPER application may be resident on mobile communications devices or smartphones of employees of a particular business or company that may have multiple geographic locations. The LEAPER application may provide enhanced emergency preparedness by reducing human risk through expedited emergency response time. In situations where seconds can make a difference, such as an emergency situation, a delay in identifying an appropriate emergency number to call may be costly. For employees that are traveling and visiting other company sites, emergency response phone numbers are unfamiliar and may be difficult to locate promptly. The LEAPER application may provide automated mechanisms or features for dialing an appropriate company site emergency services number. The LEAPER application may also provide location alert and in-case-of-emergency capability to the user on the user's mobile communications device.

FIG. 1 is a block schematic diagram of an example of a mobile communication device 100 including a location-based emergency application providing efficient response (LEAPER) 102 or system in accordance with an embodiment of the present disclosure. The location-based emergency application providing efficient response or LEAPER application 102 may also be referred to herein as location-based emergency application or emergency application. The LEAPER application 102 will be described in more detail with reference to FIG. 2 below. The mobile communications device 100 may be any type of mobile or wireless communications device which may operate based on any standard or protocol. The mobile communications device 100 may also be a laptop computer, tablet computer or any type of portable device capable of performing the functions described herein. The mobile communications device architecture shown in FIG. 1 is merely exemplary for purposes of describing the features and functions herein and is not intended to limit the devices, apparatus or methods described and claimed herein.

The mobile communications device 100 may include a radio transceiver 104 or transceivers for wireless communications. The radio transceiver 104 or transceivers may be configured for transmitting and receiving various types and frequencies of signals which may include but are not necessarily limited to radio frequency (RF) signals, Wi-Fi signals, global position system (GPS) signals, WiMAX signals, Bluetooth signals, infrared signals or other types and frequencies of signals.

The transceiver 104 may be coupled to an antenna assembly 106 for transmitting and receiving signals from a network 108 or different networks. For example, the network 108 may be a local private communications network, a wireless or cellular telephone network or other type network. The antenna assembly 106 may also transmit and receive signals from a distributed antenna system (DAS) which may be part of the network 108. For example, the DAS may be an initial communications node or access point for the network 108. The DAS may also be within a building or other facility for providing wireless or cellular communications within the building or facility and connection for mobile devices in the building or facility to the network 108. The network 108 may connect the mobile communications device 100 to a system 110, such as a wireless communications carrier or provider, location management services, a Wi-Fi system, GPS or other type communications system. The location management services may be associated with a particular organization, business or company and may be unique to each particular geographic location or site of the organization, business or company. Location management services will be described in more detail with reference to block 218 in FIG. 2.

The mobile communications device 100 may also include a processor 112 configured for performing functions comprising controlling operation of the mobile communications device 100 and processing signals received and transmitted by the transceiver 104. The communications device 100 may also include a file system 114, memory or similar data storage device. An operating system 116, applications 118 and other programs may be stored on the file system 114 for running or operating on the processor 112. The location-based emergency application providing efficient response (LEAPER) 102 may also be stored on the file system 114 and compiled for running on the processor 112 to perform the functions described herein. A web or Internet browser 120 may also be stored on the file system 114 for accessing websites and other online sources via the network 108.

The mobile communications device 100 may also include a user interface 122. The user interface 122 may include a microphone 124 and a speaker system 126 for voice communications using the mobile communications device 100 and for controlling operation of the mobile communications device 100 using voice commands. The user interface 122 may also include a display 128 for presenting visual information to the user, such as emergency information similar to that described herein. The display 128 may include or may be a touch screen type display that can receive inputs for the communications device 100 in response to the user touching selected features or icons presented on the display 128 with a finger. The display 128 or touch screen may also provide features or input mechanisms 130 for controlling operation of the communications device 100. For example, a keypad and/or QWERTY keyboard, function buttons, icons or similar input mechanisms may be presented on the display 128 for perform particular functions including those described herein.

The communications device 100 may also include an electrical power source 132 for providing electrical power to the different components of the mobile communications device 100. The electrical power source 132 may be a rechargeable battery or other electrical power generating and/or storage device.

Figure 2:
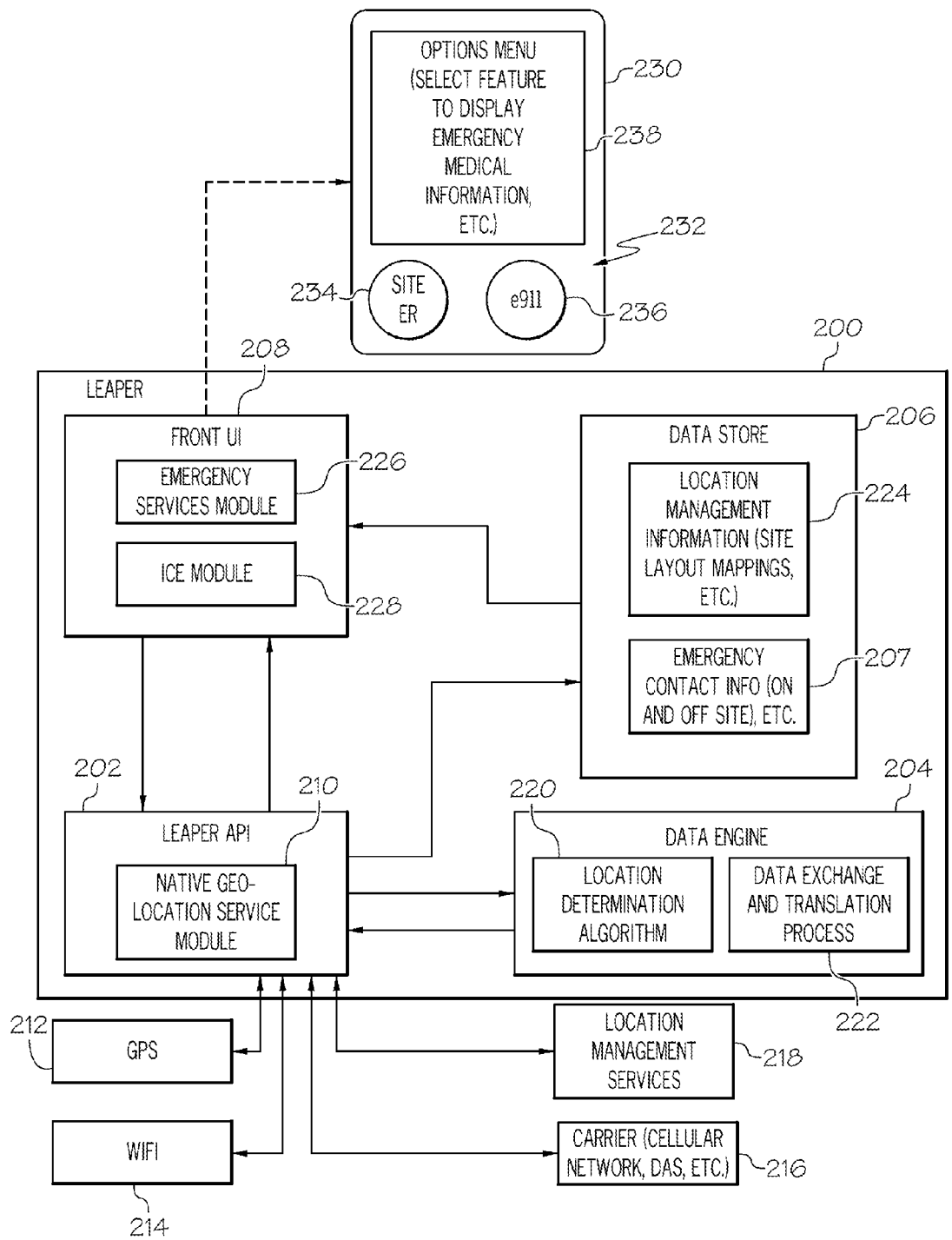
FIG. 2 is a block schematic diagram of an example of a location-based emergency application providing efficient response in accordance with an embodiment of the present disclosure.

FIG. 2 is a block schematic diagram of an example of a location-based emergency application or system providing efficient response 200 (LEAPER application) in accordance with an embodiment of the present disclosure. The LEAPER application 200 may be used for the LEAPER application 102 in FIG. 1. The LEAPER application 102 may include an application program interface (API) 202 or LEAPER API configured to send and receive geographic location information. The LEAPER application 102 may also include a data engine 204 configured to determine a current geographic location based on the geographic location information received by the LEAPER API 202. A data store 206 may store emergency contact information and other information, such as predetermined or known medical information 207 associated with each of a plurality of geographic locations. The LEAPER application 200 may additionally include a user interface (UI) module 208 or front UI. The user interface module 208 may be configured to provide emergency information including emergency contact information and other information or predetermined medical information associated with a current geographic location of the plurality of geographic locations. Other information associated with a particular geographic location may also be provided depending upon what information may be available or desired to be provided for the particular location.

The LEAPER API 202 may provide a central integration service mechanism for the LEAPER user interface 208 to effectively send and receive location and coordinate information. LEAPER API 202 may include a geo-location service module 210 that provides location context information with awareness, such as landmarks or other features to assist the user in orienting himself, and may provide a preset option for a user to select a third-party location provider, such as Google Maps or other location provider service. Google and Google Maps are trademarks of Google, Inc. in the United States, other countries or both. In addition, the LEAPER API 202 may allow for cross-platform support or permits use of location information from different sources or different geographic location technologies for determination of a current location as described herein. The LEAPER API 202 may be an interface point for integration of location information from external sources. Accordingly, the LEAPER API 202 may be configured to send and receive geographic location information from different external sources. For example, the LEAPER API 202 may be configured to receive different types of location information that may include but is not necessarily limited to information from a Global Positioning System (GPS) 212, information from a local Wi-Fi system 214, information from a wireless carrier or cellular network 216 or location information from other sources. The LEAPER API 202 may integrate location information from the different sources to more accurately determine a current geographic location. Location information from the wireless carrier may include triangulation data from a distributed antenna system (DAS) within a building or other structure or facility to determine a location of the system or device including the LEAPER application 200.

The LEAPER API 202 may also send and receive information from location management services 218. As previously described, the location management services 218 may be associated with a particular organization, business or company and may provide information that is unique to each particular geographic location or site of a plurality of geographic locations or sites of the organization, business or company. The location management services 218 may provide emergency information associated with each particular geographic location or site. For example, the location management services 218 may provide contact information for both on site and off site emergency services at the particular company location. The location management services 218 may also provide site layout mappings or building mappings or maps. The mappings, maps or floor plans may show where certain emergency equipment may be located and other locations within a facility or building that may be of importance under certain situation or circumstances.

The data engine 204 may include a location determination algorithm 220 configured for determining the current geographic location based the geographic location information received by the LEAPER API 202. The data engine 204 or location determination algorithm 220 may determine the current geographic location using triangulation location information from a distributed antenna system in combination with at least one of GPS location information, Wi-Fi location information or other information to provide a more accurate geographic location than using data from only one location information input or only triangulation. The data engine 204 may be further configured to determine the current geographic location using GPS information as a first option, a last known GPS location as a second option, Wi-Fi as a third option, and in cases where the communications device powers on, to use a nearest cell tower of a cellular communications system or network. The data engine 204 may update and store the current geographic location information in the data store 206.

The data engine 204 may also include a data exchange and translation processor 222 that utilizes an efficient wireless protocol for sending, querying, and receiving inter-building and intra-building location metadata. The data engine 204 may combine the location determination algorithm 220 with query processing by the data exchange and translation processor 222 to provide real-time location context information. The data engine 204 uses query processing with standards based alerting protocols to distinguish between private entity context information and public access point (PSAP) context information and uses the information to automatically send location position information back to the public access point (PSAP). Location context information including longitude and latitude coordinates are determinable by the data engine 204 in real-time that may permit automatic dialing of a local site emergency number. Metadata may be exchanged between a company or business and a particular wireless carrier of choice. Based on current Federal Communication Commission (FCC) rules, there are no mechanisms for information exchange between a private entity and carriers or wireless communications providers. Commercial Mobile Alert System (CMAS) is a current effort to provide an alerting infrastructure network.

The data engine 204 may combine features of Common Alerting Protocol (CAP) with the evolving Commercial Mobile Alert System (CMAS) that provides an ability to differentiate a call that may require a Public-Safety Access Point (PSAP) response or a call requiring a local company or business site response based on at least real-time location context information. CAP is a standard of the Organization for the Advancement of Structured Information Standards (OASIS) for exchanging public warning between alerting technologies. OASIS is a non-profit consortium for promoting the development, convergence, and adoption of open standards for the Global Information Society. CMAS is an alerting network to deliver warning messages to mobile devices.

The data store 206 may store the emergency contact information and other information 207, such as predetermined medical information, for both on site and off site emergency services. The data store 206 may also store location management information 224 that may include the site layout mappings and other information that may be unique to each geographic location of the plurality of geographic locations.

The user interface module 208 may include an emergency services module 226 configured to display emergency services site coordinates for the particular geographic location and to allow for automatic connection to emergency services, either on or off site based features of the CAP and/or CMAS similar to that previously described. The user interface module 208 may also include an in-case-of-emergency (ICE) module 228. The ICE module 228 may be configured to display emergency contact information, other information and medical information associated with the user on the mobile communications device 230 of the user.

The user interface module 208 may also be configured to present a screen 232 on the mobile communications device 230 that may include a first feature 234 for dialing a site emergency response number for the current geographic location in response to the first feature 234 being activated by a user and a second feature 236 for dialing a public-safety access point in response to the second feature 236 being activated by the user. The screen 232 may be a touch screen configured for activation of features on the screen 232 in response to being touched by a human finger. Accordingly, the first feature 234 and the second feature 236 may be a button, icon or other feature displayed on the screen 232 that may be activated by the user touching the feature with a finger to dial either the site emergency response number or the public-safety access point or e911 number.

The user interface module 208 may also be configured to present a screen including an options menu 238. The options menu 238 may include a feature to select to display emergency medical information and/or other pertinent information associated with the user on a home screen or other screen of the mobile communications device 230 of the user. The emergency medical information may include but is not necessarily limited to emergency contact information and other predetermined medical information (spouse, next of kin, etc.), medical conditions, allergies, current medications or any other information that may be of use to emergency responders.

Figure 3:
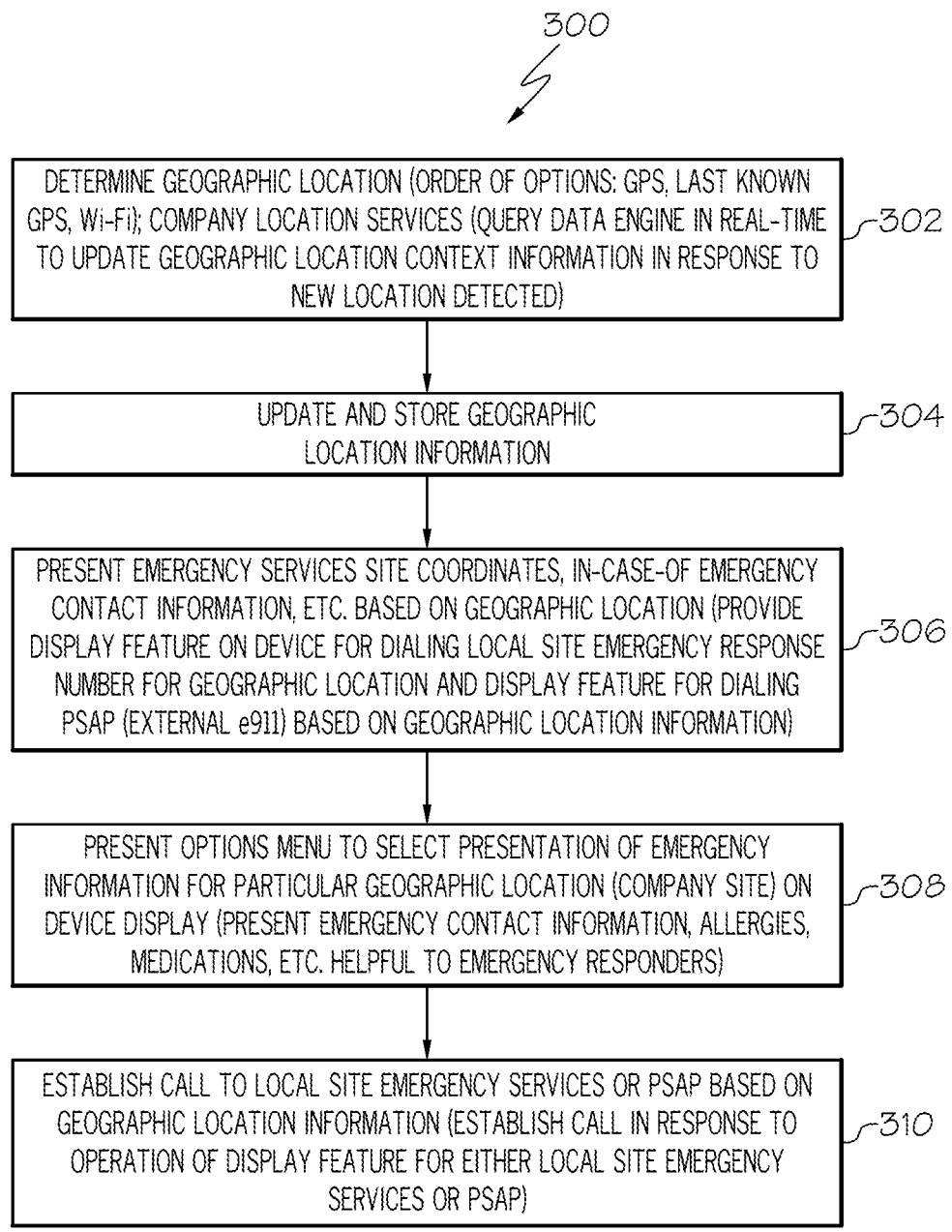
FIG. 3 is an example of a method of operation of a location-based emergency application providing efficient response in accordance with an embodiment of the present disclosure.

FIG. 3 is an example of a method 300 of operation of a location-based emergency application providing efficient response in accordance with an embodiment of the present disclosure. The method 300 may be embodied in and performed by the LEAPER application 102 in FIGS. 1 and 200 in FIG. 2. In block 302, a geographic location may be determined. The geographic location may be determined by GPS, a last known GPS position, Wi-Fi, triangulation, triangulation in combination with one or more of the preceding locating technologies, or other mechanism or technology for determining geographic location. As previously discussed, the geographic location may be determined using certain techniques or technologies in a particular order, such as GPS as a first option, last known GPS position as a second option and Wi-Fi as a third option and in situations where the communications device 230 is powered on, the nearest cell tower of a cellular communications system or network may be used. If the mobile communications device is communicating with a distributed antenna system, the geographic position may be determined by triangulation and may also utilize one or more of these other geographic location technologies in combination with the triangular to provide a more accurate geographic location than would be possible with just triangulation. As previously discussed, the data engine 204 in FIG. 2 may be queried in real-time to update geographic location context information in response to detecting that the mobile communications devices has moved into a new geographic location. Company location management services may also be accessed to provide emergency services information based on the current location of the mobile communications device. In block 304, the updated geographic location information and corresponding emergency information may be stored.

In block 306, emergency services site coordinates, in-case-of-emergency (ICE) contact information and any other information that may be useful in an emergency situation or other circumstances may be presented on a display of the communications device based on the current geographic location. Similar to that previously described, a feature or features may be displayed on the device for dialing a local site emergency response number and/or dialing a public-safety access point or external e911 based on the geographic location information.

In block 308, an options menu may be presented to select different options including presentation of emergency information for the particular geographic location or company site on the display of the mobile communications device. For example, the options menu may permit the user to select an option for presentation of information, such as emergency contact information, other predetermined or known medical information, medical conditions, allergies, medications or other information associated with the user that may be helpful to emergency responders or others. The information may be presented on a home screen or other screen of the mobile communications device that can be accessed by emergency responders or others in the event the user is incapacitated.

In block 310, a call may be established to local site emergency services or a public-safety access point based on at least the geographic location information. The call may be established in response to operation of a feature displayed on the device for calling either the local site emergency services or public-safety access point, similar to that previously described with reference to FIG. 2. The call may also be automatically established to either the local site emergency services number or public-safety access point depending upon predetermined conditions that may be associated with Common Alerting Protocol (CAP) and the Commercial Mobile Alert System (CMAS) similar to that previously discussed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system including a location-based emergency application providing efficient response, comprising:
    a processor in a mobile communications device;
    a location-based emergency application operating on the processor, the location-based emergency application comprising:
        an application program interface configured to send and receive geographic location information;
        a data engine configured to determine a current geographic location of the system based on the geographic location information received by the application program interface;
        a data store that stores emergency contact information and other information associated with each of a plurality of geographic locations; and
        a user interface module configured to provide emergency contact information and other information associated with a particular geographic location of the plurality of geographic locations in response to the current geographic location of the system being the particular geographic location, wherein the user interface module is configured to present a screen comprising an options menu comprising a feature to select to display emergency medical information of a user, the emergency medical information comprising any medical conditions, allergies and current medications of the user.

2. The system of claim 1, wherein the data engine is configured to determine a geographic location using triangulation location information from a distributed antenna system in combination with at least one of global positioning system location information and Wi-Fi location information to provide a more accurate geographic location than using only one location information input.

3. The system of claim 1, wherein the data engine is configured to determine the current geographic location using global positioning system information as a first option, a last known global positioning system location as a second option and Wi-Fi as a third option.

4. The system of claim 1, wherein the data engine updates and stores the current geographic location in the data store.

5. The system of claim 1, wherein the application program interface is configured to integrate location information from different sources comprising a global positioning system, a local Wi-Fi system, and a wireless carrier.

6. The system of claim 5, wherein the application program interface comprises a native geo-location service module configured to support different geographic location technologies for determination of the current geographic location.

7. The system of claim 1, wherein the user interface module comprises:
    an emergency services module configured to display emergency services site coordinates for the particular geographic location and to allow for automatic connection to emergency services; and
    an in-case-of-emergency module configured to display emergency contact information, other information and medical information associated with a user.

8. The system of claim 1, wherein the user interface module is configured to present a screen comprising:
    a first feature for dialing a site emergency response number for the current geographic location in response to the first feature being activated by a user; and
    a second feature for dialing a public-safety access point in response to the second feature being activated by the user.

9. The system of claim 1, further comprising location management information stored on the data store, the location management information comprising site layout mappings associated with the plurality of geographic locations, wherein a particular site layout mapping corresponding to the current geographical location of the system is displayable in response to activation of a user interface feature.

10. The system of claim 1, wherein the data engine comprises a data exchange and translation processor that utilizes a wireless protocol for sending, querying and receiving inter-building and intra-building location metadata, the data engine combines a location determination algorithm and query processing to provide real-time location context information.

11. The system of claim 1, wherein the data engine is configured to cause the mobile communications device running the location-based application to automatically call one of a public-safety access point and a local site emergency services number and to differentiate between calling the public-safety access point or the local site emergency services number based on at least real-time location context information.

12. The system of claim 1, wherein the data engine is configured to determine a geographic location within a structure by using triangulation information from at least a distributed antenna system within the structure.

13. A mobile communications device, comprising:
    a transceiver for wireless communications;
    a processor configured for performing functions comprising controlling operation of the mobile communications device and processing signals received and transmitted by the transceiver;
    a location-based emergency application providing efficient response configured to operate on the processor, the location-based emergency application comprising:
        an application program interface configured to send and receive geographic location information;
        a data engine configured to determine a current geographic location of the mobile communications device based on the geographic location information received by the application program interface;
        a data store that stores emergency contact information and other information associated with each of a plurality of geographic locations; and
        a user interface module configured to provide emergency contact information and other information associated with a particular geographic location of the plurality of geographic locations in response to the current geographic location of the mobile communications device being the particular geographic location, wherein the user interface module is configured to present a screen comprising an options menu comprising a feature to select to display emergency medical information of a user, the emergency medical information comprising any medical conditions, allergies and current medications of the user.

14. The mobile communications device of claim 13, wherein the data engine is configured to determine a geographic location using triangulation location information from a distributed antenna system in combination with at least one of Wi-Fi location information and global positioning system location information to provide a more accurate geographic location than using only one location information input.

15. The mobile communications device of claim 13, wherein the user interface module comprises:
an emergency services module configured to display emergency services site coordinates for the particular geographic location and to allow for automatic connection to emergency services; and
an in-case-of-emergency module configured to display emergency contact information, other information and medical information associated with a user.

16. The mobile communications device of claim 13, wherein the user interface module is configured to present a screen comprising:
a first feature for dialing a site emergency response number for the current geographic location in response to the first feature being activated by a user; and
a second feature for dialing a public-safety access point in response to the second feature being activated by the user.

17. The mobile communications device of claim 13, wherein the data engine is configured to cause the mobile communications device running the location-based application to automatically call one of a public-safety access point and a local site emergency services number and to differentiate between calling the public-safety access point or the local site emergency services number based on at least real-time location context information.

18. A method for providing a location-based emergency response, comprising:
receiving, by a mobile communications device, geographic location information;
determining, by a data engine on the mobile communications device, a current geographic location of the mobile communication device based on the geographic location information;
providing, by the communications device, emergency contact information and other information associated with a particular geographic location of a plurality of geographic locations in response to the current geographic location of the communications device being the particular geographic location, wherein emergency contact information and other information associated with each of the plurality of geographic locations is stored on the mobile communications device; and
presenting a screen on a display of the communications device, the screen comprising an options menu comprising a feature to select to display emergency medical information of a user, the emergency medical information comprising any medical conditions, allergies and current medications of the user.

19. The method of claim 18, further comprising determining a geographic location using triangulation location information from a distributed antenna system in combination with at least one of global positioning system location information and Wi-Fi location information to provide a more accurate geographic location than using only one location information input.

20. The method of claim 18, further comprising:
automatically calling one of a public-safety access point or a local site emergency services number; and
differentiating between calling the public-safety access point or the local site emergency services number based on at least real-time location context information.

\* \* \* \* \*